P. H. BACON.
METER SERVICE LEAD CONNECTION FOR THREE-WIRE SYSTEMS.
APPLICATION FILED NOV. 10, 1911.
1,052,555. Patented Feb. 11, 1913.
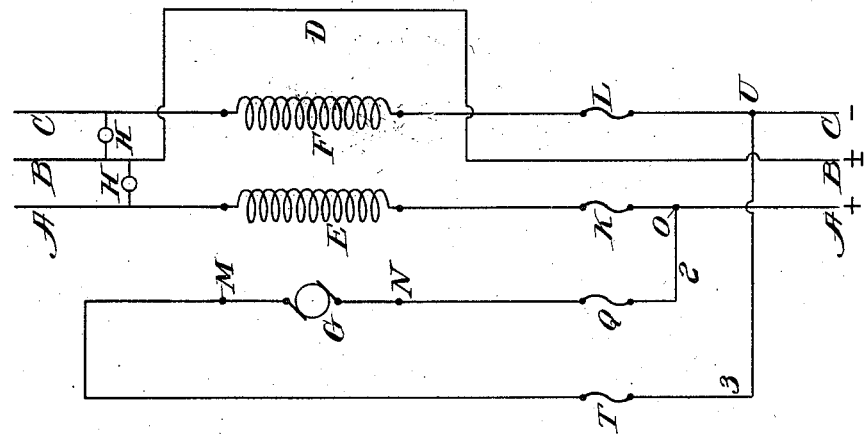
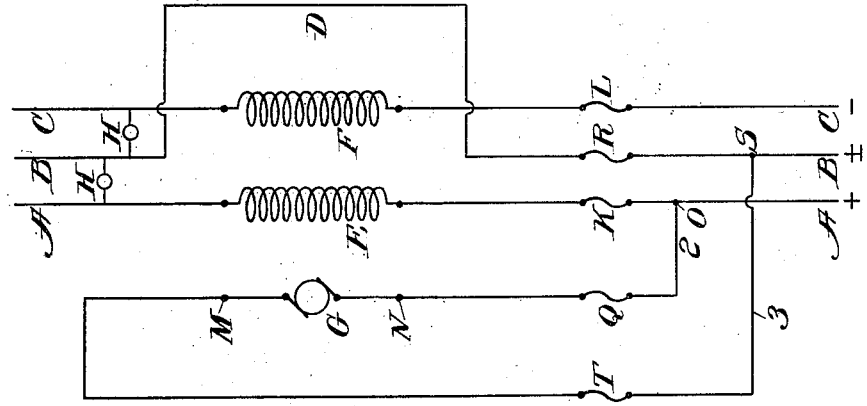
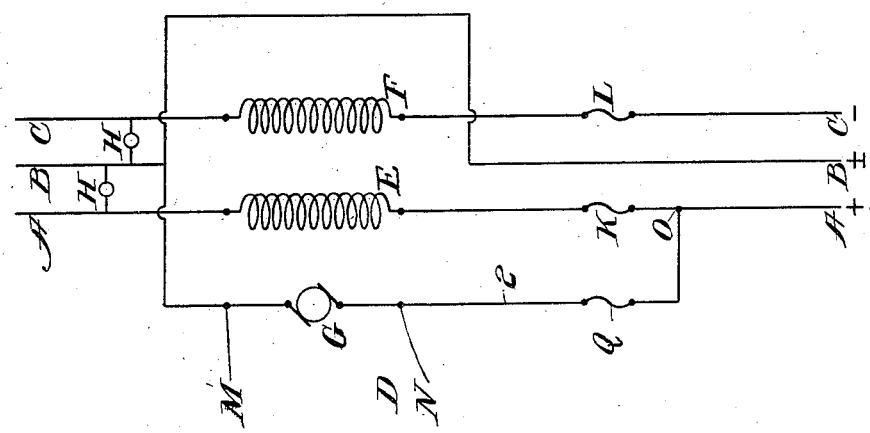
Witnesses:
Gertrude T. Porter.
May T. McGarry.
Inventor
Paul H. Bacon,
By his Attorney

UNITED STATES PATENT OFFICE.

PAUL H. BACON, OF NEW YORK, N. Y.

METER-SERVICE LEAD CONNECTION FOR THREE-WIRE SYSTEMS.

1,052,555. Specification of Letters Patent. Patented Feb. 11, 1913.

Application filed November 10, 1911. Serial No. 659,503.

*To all whom it may concern:*

Be it known that I, PAUL H. BACON, a citizen of the United States, residing at New York, in the county of New York and State of New York, have invented a certain new and useful Improvement in Meter-Service Lead Connections for Three-Wire Systems, of which the following is a specification.

Under ordinary conditions, when a fuse, in the positive or neutral load lead of a three-wire system, is removed or blows, the meter becomes inoperative and it is accordingly possible to steal current from the supply leads. I have discovered that this can be prevented by a suitable connection of the potential or armature coil of the meter; so that, despite the removal or blowing of the fuse, or fuses, circuit will nevertheless be maintained through said potential coil, which, coöperating with the active field coil, will insure the continued operativeness of the meter.

The accompanying drawings illustrate diagramatically various embodiments of my invention.

In Figure 1, my invention is shown applied to a three-wire system and three-wire 105 volt meter having fuses in the positive and negative leads. In Fig. 2, it is shown applied to a three-wire system and three-wire 105 volt meter having fuses in all three leads. In Fig. 3, it is shown applied in connection with a three-wire system and three-wire 210 volt meter.

Similar letters and numbers of reference indicate like parts.

A, B, C are, respectively, the positive, neutral and negative leads of a three-wire supply system.

D is a meter, in which E and F are the field coils and G the potential or armature coil.

In Fig. 1, the positive and negative supply leads A, C are respectively connected to terminals of the field coils E, F, the opposite terminals of said coils being connected to the load indicated by the lamps at H. In said positive and negative leads are interposed fuses K, L. One terminal M of the potential coil G in the meter is connected to the neutral lead B, and the other terminal N is connected by wire 2 to a point, as O, between the fuse K and the source of current supply. In such case, while the removal or blowing of fuse K opens circuit to the field coil E, it does not interrupt circuit through potential coil G. Hence both field coil F and potential coil G being energized, the meter continues operative and will register current surreptitiously taken from the leads B, C. In order to protect the meter and main fuse, a fuse Q is preferably interposed in the wire 2.

In Fig. 3, the circuit potential is 210 volts, and, in this case, the arrangement is as in Fig. 2, with the difference that the wire 3 is connected to the negative lead C at a point, as U, between the fuse L and the source of current supply.

I claim:

1. In combination with service leads, and means for opening circuit in one of said leads, a meter having its potential circuit connected to said lead at one point only; said point being located on the service side of said circuit opening means.

2. In combination with service leads, and a fuse in one of said leads, a meter having its potential circuit connected to said lead at one point only; said point being located on the service side of said fuse.

3. In combination with service leads, and a fuse in one of said leads, a meter having its potential circuit connected to said lead at one point only, said point being located on the service side of said fuse, and a fuse in said potential circuit.

In testimony whereof I have affixed my signature in presence of two witnesses.

PAUL H. BACON.

Witnesses:
GERTRUDE T. PORTER,
MAY T. MCGARRY.